April 6, 1926.

H. W. SWEET 1,579,737

INTERNAL BEARING ADJUSTING MEANS

Filed Feb. 29, 1924

INVENTOR.
Henry W. Sweet.
BY Parsons & Bodell.
ATTORNEYS.

Patented Apr. 6, 1926.

1,579,737

UNITED STATES PATENT OFFICE.

HENRY W. SWEET, OF SYRACUSE, NEW YORK, ASSIGNOR TO THE BROWN-LIPE GEAR COMPANY, OF SYRACUSE, NEW YORK, A CORPORATION OF NEW YORK.

INTERNAL-BEARING-ADJUSTING MEANS.

Application filed February 29, 1924. Serial No. 696,091.

*To all whom it may concern:*

Be it known that I, HENRY W. SWEET, a citizen of the United States, and a resident of Syracuse, in the county of Onondaga and State of New York, have invented a new and useful Internal-Bearing-Adjusting Means, of which the following is a specification.

This invention has for its object a bearing adjusting means particularly adapted to adjust the conical antifriction bearings such as are used in transmission gearings embodied in motor vehicles, which bearing adjusting means is particularly simple and economical in construction, readily applied or built into the gearing or other mechanism, easily operated and highly efficient and durable in use.

The invention consists in the novel features and in the combinations and constructions hereinafter set forth and claimed.

In describing this invention, reference is had to the accompanying drawings in which like characters designate corresponding parts in all the views.

Figure 1:
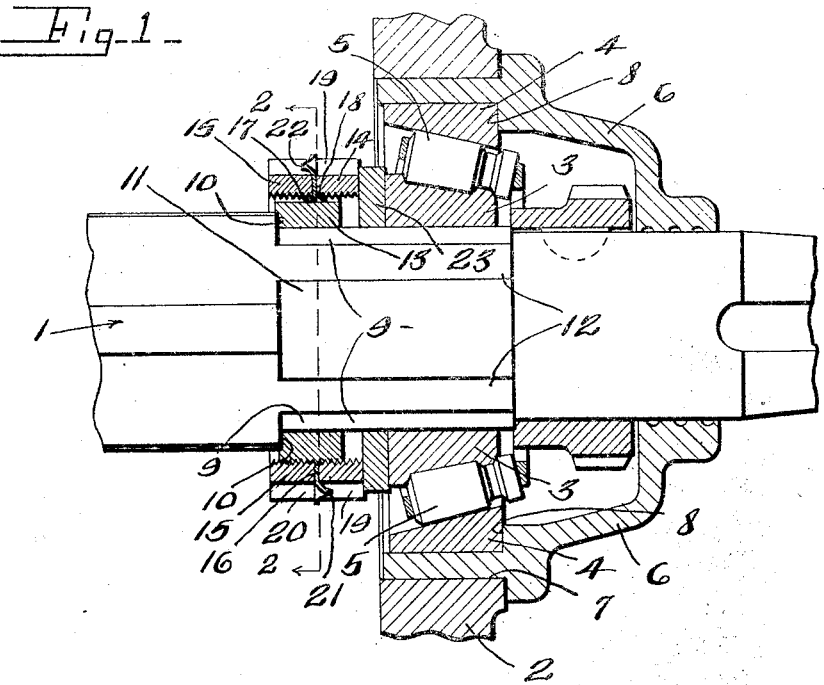
Figure 1 is a fragmentary sectional view of this bearing adjusting means, the contiguous portion of a shaft of a transmission gearing and the inclosing case being shown.
Figure 2:
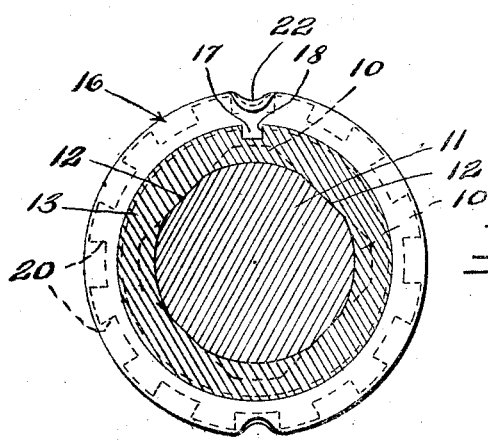
Figure 2 is a sectional view on line 2—2, Fig. 1.

This bearing adjusting means comprises, the combination with a shaft and a conical antifriction bearing therefor including an inner member or ring mounted on the shaft to rotate therewith and slide axially thereon or permit the shaft to slide thereon, of means carried by the shaft for effecting such relative shifting movement to tighten the bearing.

1 designates the shaft, which is journalled in the bearing carried in a wall 2 of the gear casing, the bearing comprising inner and outer rings 3, 4 having opposing conical faces and rollers 5 interposed between such faces. The outer ring 4 is here shown as carried by a cap 6 suitably supported in an opening 7 in the wall 2 and thrusting at its outer side against a shoulder at 8 formed in such cap. The inner ring 3 is slidably mounted on the shaft 1 to rotate therewith. As here shown, the shaft is formed square in cross section and the corners of the portion 11 thereof extending into the bearing ring are rounded off, as shown at 9, leaving the shoulders 10 opposed to and spaced from the ring 3, and flat faces 12 between the rounded off portions 9. The bore of the ring 3 is shaped to slidably fit the rounded off faces 9 and flat faces 12.

The bearing adjusting means acts to thrust in opposite directions against the shoulders 10 and against the bearing ring 3 and includes a collar 13 rotatable with the shaft 1 and mounted on the portion 11 thereof and thrusting against the shoulder 10, a nut 14 threading on the collar 13 and thrusting against the inner ring 3 and means for holding the nut 14 from turning relatively to the collar 13. The bore of the collar fits the rounded off faces 9 and flat faces 10 of the shaft.

The means for holding the nut 14 from turning comprises a second nut 15 threading on the collar 13 and a lock washer 16 interposed between the nuts 14, 15 and having a tongue 17 interlocked in the lengthwise groove 18 formed in the collar 13 and also having means for interlocking with each of the nuts. Usually the nuts 14, 15 are formed with peripheral notches 19 and 20 respectively and the washer is interlocked with such notches by indenting a portion, as 21, in one direction into the notch 19 of the nut 14 and another portion as 22, into the notch 20 of the nut 15. Preferably a washer 23 is interposed between the nut 14 and the inner bearing ring 3.

In operation, when any looseness develops in the bearing, the indentations 21 and 22 are removed by any suitable tool and the nuts 14 and 15 tightened to shift the inner ring 3 outwardly to the right, thus taking up any looseness in the bearing, and the washer again provided with indentations 21 and 22. The adjustment of the nut may also thrust the shaft 1 axially in the opposite direction or to the left and thus take up any looseness in the bearing at the left end of the shaft as well as any looseness in the bearing at the right end of the shaft.

What I claim is:

1. The combination with a shaft and a bearing including a member mounted on the shaft to rotate therewith, the shaft and the bearing being arranged to have a relative axial adjusting movement, the shaft having a shoulder opposed to and spaced-apart from said member, and the portion of the shaft on which said member is mounted being of less diameter than said shoulder, of bearing adjusting means comprising a collar mounted on the portion of shaft of smaller diameter and thrusting against said shoulder, the collar being rotatable with the shaft and being of greater diameter than the shoulder, and a nut threading on the collar and thrusting against the bearing member, all whereby the bearing member and collar are placeable on and removable from the shaft by a sliding of the same endwise on the portion of the shaft of less diameter.

2. The combination with a shaft and a bearing including a member mounted on the shaft to rotate therewith, the shaft and the bearing being arranged to have relative axial adjusting movement, the shaft having a shoulder of greater diameter than the portion of the shaft on which the bearing is mounted, the shoulder being opposed to and spaced-apart from said member, of a bearing adjusting means comprising a collar mounted on the portion of the shaft of less diameter and rotatable therewith, and thrusting against said shoulder, a nut threading on the collar and thrusting against said bearing member, and means on the collar for holding the nut from turning relatively to the collar.

In testimony whereof, I have hereunto signed my name, at Syracuse, in the county of Onondaga, and State of New York, this 26th day of Feb. 1924.

HENRY W. SWEET.